United States Patent
Bohannon (10) Patent No.: US 7,406,521 B2
(45) Date of Patent: Jul. 29, 2008

(54) SYSTEM AND METHODS FOR CONTROLLED DEVICE ACCESS

(76) Inventor: Gary P. Bohannon, P.O. Box 575, Chewelah, WA (US) 99109-0575

( * ) Notice: Subject to any disclaimer, the term of this patent is extended or adjusted under 35 U.S.C. 154(b) by 842 days.

(21) Appl. No.: 10/914,708

(22) Filed: Aug. 9, 2004

(65) Prior Publication Data
US 2005/0033837 A1 Feb. 10, 2005

Related U.S. Application Data

(60) Provisional application No. 60/493,498, filed on Aug. 9, 2003.

(51) Int. Cl.
G06F 15/16 (2006.01)
G06F 15/173 (2006.01)

(52) U.S. Cl. .................... 709/225; 709/203; 709/218; 709/224; 709/229

(58) Field of Classification Search .............. 705/29; 709/224, 238, 203, 218, 223, 225, 229
See application file for complete search history.

(56) References Cited

U.S. PATENT DOCUMENTS

| | | | |
|---|---|---|---|
| 3,581,029 A | 5/1971 | Noiles | |
| 4,348,696 A | 9/1982 | Beier | |
| 5,046,157 A | 9/1991 | Smith et al. | |
| 5,051,837 A | 9/1991 | McJunkin | |
| 5,168,372 A | 12/1992 | Sweetser | |
| 5,331,353 A * | 7/1994 | Levenson et al. | 725/29 |
| 2003/0195982 A1 * | 10/2003 | Motoyama et al. | 709/238 |
| 2003/0200308 A1 * | 10/2003 | Tameda et al. | 709/224 |

OTHER PUBLICATIONS

"Eyetimer.com" web page print out, copyright 2004.

* cited by examiner

*Primary Examiner*—Quang N. Nguyen
(74) *Attorney, Agent, or Firm*—Gregory IPL, P.C.; John S. Reid (57) ABSTRACT

A system and method is directed to managing media access in a controlled media system. The method includes communicating usage reports that are based on usage information from local usage records associated with one or more user devices controlled by each local control unit to a system control unit from one or more local control units, update global usage records that associate device usage with one or more user accounts based on the usage reports, transmitting the updated global usage records to each local control unit, and updating the local usage records responsive to receipt of the updated global usage records and causing each local control unit to selectively enable and disable each user device based on the updated local usage records, and, when updated global usage records are not received causing each local control unit to selectively enable and disable each user device based on local usage records.

27 Claims, 6 Drawing Sheets

SYSTEM AND METHODS FOR CONTROLLED DEVICE ACCESS

CLAIM OF PRIORITY

This Application claims priority to U.S. Provisional Patent Application Ser. No. 60/493,498 filed 9 Aug., 2003 entitled "Apparatus for Controlling Access to Electrical Devices," which is hereby incorporated by reference herein in its entirety.

BACKGROUND

Electronic devices have become more and more a part of everyday life. Electronic devices provide a positive influence on life in many ways, such as, for example being utilized to improving living conditions, enhance learning development, increase entertainment value, and the like.

Access control of electronic devices can allow supervision of electronic devices, such as, for example parents monitoring media or length of time a child spends utilizing electronic devices, teachers monitoring media or length of time a student spends utilizing electronic devices, correctional facilities officers monitoring media or length of time an inmate spends utilizing electronic devices, and the like. Supervised monitoring of electronic devices can provide a more disciplined and stable environment for the subject of the supervision.

Unfortunately, existing electronic device management systems do not address many issues relating to access control of electronic devices. The present invention advances the state of the art in the areas of access control of electronic devices.

SUMMARY

According to an embodiment of the present invention, a computer readable medium storing a computer program to manage media access in a controlled media system includes: computer readable code to communicate usage reports based on usage information from local usage records associated with one or more user devices controlled by each local control unit to a system control unit from one or more local control units; computer readable code to update global usage records associating device usage with one or more user accounts based on the usage reports; computer readable code to transmit the updated global usage records to each local control unit; and computer readable code to update the local usage records responsive to receipt of the updated global usage records and cause each local control unit to selectively enable and disable each user device based on the updated local usage records. When updated global usage records are not received, the computer readable code causes each local control unit to selectively enable and disable each user device based on local usage records.

According to another embodiment, a computer readable medium storing a computer program to manage media access in a controlled media system includes: computer readable code to produce a usage report that is based on usage information from local usage records associated with one or more user devices controlled by a local control unit at the local control unit; computer readable code to communicate the usage report to a system control unit from the local control unit; computer readable code to detect the reception of updated global usage records that associate device usage with one or more user accounts from the system control unit; and computer readable code to update the local usage records responsive to receipt of the updated global usage records, and cause the each local control unit to selectively enable and disable each user device based on the updated local usage records. When updated global usage records are not received, the computer readable code causes each local control unit to selectively enable and disable each user device based on local usage records.

According to yet another embodiment, a controlled media system includes a system control unit, at least one local control unit in selective communication with the system control unit, and at least one user device controlled by, and in selective communication with, each local control unit. The controlled media system further includes at least one processor within the system control unit and at least one computer readable memory device within the system control unit which is readable by the processor. The computer readable memory device contains a series of computer executable steps configured to cause the processor to communicate a usage report, based on usage information from a local usage record associated with each user device controlled by each local control unit, to the system control unit from each local control unit. The computer readable memory device further contains a series of computer executable steps configured to cause the processor to update a global usage record that associates user device usage with one or more user accounts based on each usage report, and transmit the updated global usage record to each local control unit. Each local usage record is updated responsive to receipt of the updated global usage record at each the local control unit wherein the associated local control unit is configured to selectively enable and disable the at least one user device associated with the local control unit based on the associated updated local usage record. Each associated local control unit is further configured to selectively enable and disable the associated at least one user device based on the local usage record when the updated global usage record is not received.

According to another embodiment, a controlled media system includes a system control unit that tracks global usage of user devices by global user account. The controlled media system further includes at least one local control unit in selective communication with the system control unit In the controlled media system, each local control unit tracks usage information and communicates usage reports based on the usage information to the system control unit. The usage information includes local use of user devices by local user account. The controlled media system additionally includes at least one user device controlled by, and in selective communication with, each local control unit. Each local control unit is configured to selectively enable and disable associated user devices based on the local control unit monitoring of one or more local user accounts. The system control unit provides updated global user accounts to each local control unit based on the global usage of user devices, wherein each local control unit updates the local user accounts with the updated global user accounts.

The foregoing, and other features and advantages of the invention, will become further apparent from the following detailed description of the presently preferred embodiments, read in conjunction with the accompanying drawings.

DETAILED DESCRIPTION

The invention described herein provides methods and apparatus for controlling one or more user's access to user devices, such as televisions, video game systems, computers, telephones, etc. Although the invention can take a number of different forms, in one example a controlled media system in accordance with the invention includes a system control unit which can be placed in electronic communication with one or more local control units. Each local control unit can, in turn, be placed in selective control of one or more user devices. The local control unit can selectively enable or disable each associated user device. A system administrator can access the system control unit to enter allocated usage times for the various user devices on a user-by-user basis. For example, the administrator can authorize user "A" to have computer access for 1 hour a day, television access for one hour a day, and so on, while user "B" might be allocated 2 hours of computer access time, and half-an-hour of television access time. Further, the administrator can authorize each user for an overall amount of user device access time for a day. For example, in the above example user "A" might be allocated 2 hours of access time for each of three different user devices, but an overall daily allocation of only 2 hours. Accordingly, the user can determine which user devices he or she wishes to access, but in no event will the user be able to access devices in any combination for more than two hours.

Once a user's allocated access time for a given user device is exhausted, then the system control unit directs the local control units to deny this user access to any such user devices connected to the system. Likewise, once a user's total daily allocated access time (regardless of user device) is exhausted, then the system control unit directs the local control units to deny this user access to all user devices connected to the system. Furthermore, as will be described below, the local control units can directly deny a user access to a user device, without direction from the system control unit.

Typically, the user accesses a user device by logging into a local control unit with a password, and the local control unit enables access to the device. When the user is finished accessing the device, he or she logs out using the local controller, and the local control unit then disables access to the device. The local controller thus keeps local usage records by user and by user device (for those devices under control of the local control unit), and updates a local usage report. If a user's allocated time is exhausted, the local control unit denies access to (i.e., does not enable) the user device for that user.

Furthermore, the local controllers can send the local usage reports to the system control unit, which can then compile the local usage records into a global usage report. The global usage report can then be distributed to the local control units so that the local usage reports at each control unit can be updated with overall user usage information. Accordingly, if a user accesses a computer under control of a first local controller, and then later accesses another computer under the control of a second local control unit, the global report will capture both usage instances, and will then communicate this information to the local controllers so that a user cannot defeat the system (and thus obtain more usage time than is allocated) by going from local controller to local controller. However, if the system control unit is unavailable for some reason (power failure, communication link failure with the local unit, etc.) then the local control unit relies on the latest available local usage report to control access to the user devices under the control of the local control unit.

Other features can be incorporated into the exemplary system described above. For example, local control units can be configured to detect when a user device is being operated in an educational/study (EDU) mode, and thus not deduct time from the user's account during such educational use of the device. For example, a user selects the educational/study (EDU) mode, such as, English, reading, math or any further educational enhancements and makes a choice of a specific challenge/level of difficulty for the lesson. In this example, as the user provides correct answers, the system credits the user a predetermined value of user time, such as generic user time or specific user time associated with a specified user device (e.g., a TV). The result of the EDU mode is to enhance the user's educational skills and to further usage of the media. In this example, once the user leaves the EDU mode, then the device usage is deducted in the manner previously discussed.

The EDU mode provides administrators and parents a useful tool to utilize the already available media devices to improve the children, students, inmates educational level and provide feedback to administrators and parents. The apparatus and methods described herein are particularly useful in a distributed environment, such as an institutional environment (a penitentiary, for example) where user devices may exist in different buildings and different rooms within buildings. The use of the central system control unit allows an administrator to track and manage use of a large number of user devices over a large area for a large number of users, and reduces the opportunity for a user to defeat the system. Further, the local control units, as configured, allow a local control unit to continue to operate even when communication between the local control unit and the central control system is lost. This can be very advantageous since users will not be denied access to local user devices merely because of a problem with the central control system. While the system does remove the administrator to some degree from the user, such that the user does not perceive the administrator to be personally controlling the user's access to user devices, the user may still feel that excessive control is being exercised if the entire system is unavailable for access due to a problem with the central control system. The system described herein overcomes this concern. As can be appreciated, it can be important to avoid being overly controlling in an environment such as a penitentiary, and a system in accordance with the present invention achieves a happy medium between controlling user access to user devices, and not putting a central controller in the position of being over-controlling.

Figure 1:
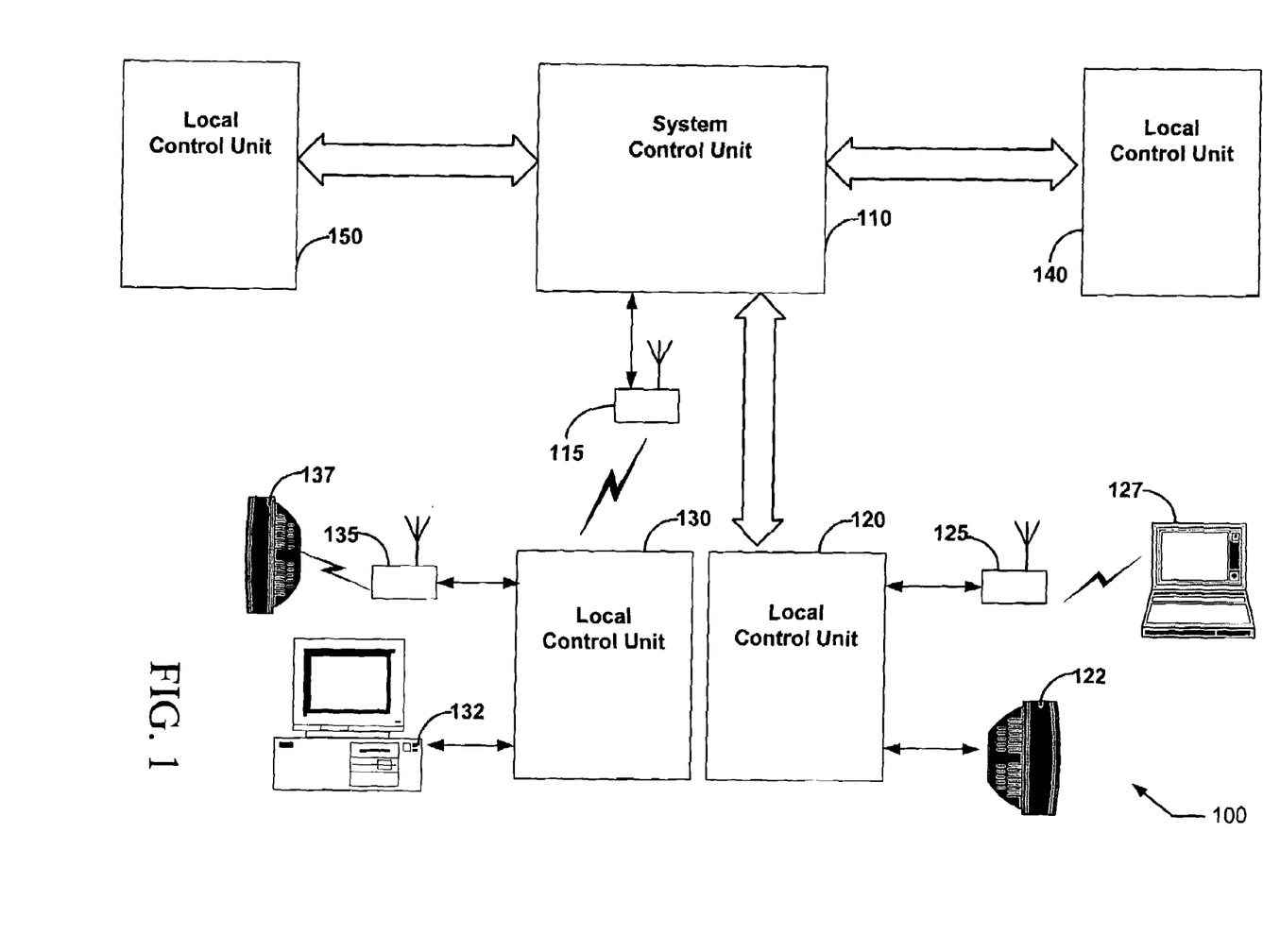
FIG. 1 is a block diagram of a controlled media system, illustrating an exemplary operating environment for one embodiment of the invention.

Turning now to the figures, FIG. 1 illustrates a controlled media system in an exemplary operating environment. FIG. 1 illustrates a controlled media system 100 for managing device access within a controlled media system. Controlled media system 100 includes system control unit 110, local control units (120-150), and user devices (122, 127, 132, and 137). System control unit 110 further includes wireless hub 115. Wireless hub 115 assists in system control unit 110 selectively communicating with local control unit 130. Local control units (120 and 130) further include wireless hubs (125 and 135, respectively). Wireless hubs (125 and 135) assist in local control units (120 and 130) selectively communicating with user devices (127 and 137, respectively). Controlled media system 100 can include additional components not relevant to the present discussion.

System control unit 110 is selectively coupled to local control units (120-150) and performs global management of device access for controlled media system 100. In an example, system control unit 110 is selectively coupled directly to local control unit 120. In another example, system control unit 110 is selectively coupled wirelessly to local control unit 130 via wireless hub 115. Wireless hub 115 is any wireless communication-enabled hub including the requisite components to provide wireless coupling of local control unit 130 to a system incorporating system control unit 110.

In one embodiment, a server computer (not specifically shown) having network services software implements the functions of system control unit 110. In this embodiment, the server computer (not specifically shown) having network services software includes a communications bus, at least one processor, a computer readable memory device which is readable by the processor, and other such components as are necessary to provide network services component functionality. In another embodiment, the capabilities and functions of system control unit 110 are distributed among one or more connected devices (not shown).

Local control units (120-150) are communication enabled control units that are selectively coupled to user devices as well as system control unit 110, and provide local management of device access for the controlled media system 100. Local control unit 120 is selectively coupled to user device 122 directly, and to user device 127 via wireless hub 125. Wireless hub 125 is any wireless communication-enabled hub including the requisite components to provide wireless coupling of user device 127 to a system incorporating local control unit 120. Local control unit 130 is selectively coupled to user device 132 directly, and to user device 137 via wireless hub 135. Wireless hub 135 is any wireless communication-enabled hub including the requisite components to provide wireless coupling of user device 137 to a system incorporating local control unit 130. In one embodiment, each local control unit (120-150) includes a communications bus, at least one processor, a computer readable memory device which is readable by the processor, and other such components as are necessary to provide local management of device access functionality.

User devices (122, 127, 132, and 137) are controlled by, and in selective communication with, local control units (120 and 130). In one embodiment, user devices (122, 127, 132, and 137) are selectively coupled to local control units (120 and 130), receive enablement/disablement from an associated control unit, and provide a service based on the received enablement/disablement. User devices are electrical devices having features and options that provide specific services, such as, for example living assistance, education assistance, entertainment, and the like. Examples of user devices include a television (TV) device, a computing (e.g., a personal computer or a laptop computer) device, a radio device, a sound system device, a console entertainment device, a printer device, a telephone device, and Internet access devices, such as cable modem, DSL modem, broadband router, and the like.

User device 122 is implemented as a television (TV) or a combination of TV monitor and receiver system (not shown) to provide entertainment. In an example, the TV further includes one or more additional media players/recorders, such as, video tape, DVD, and the like.

User device 127 is implemented as a personal computer (PC) and is any PC or laptop that is a communication-enabled computer system having a memory component and a processor (not shown). In one embodiment, the memory component includes programs and data (not shown) such as, for example, an operating system, as will be known to those skilled in the art. The skilled practitioner will recognize that in some implementations the personal computer includes other components not relevant to the present discussion, and therefore do not require elaboration.

User device 132 is implemented as laptop computer and is any laptop or personal computer (PC) that is a wireless communication-enabled computer system having a memory component and a processor (not shown). In one embodiment, the memory component includes programs and data (not shown) such as, for example, an operating system, as will be known to those skilled in the art. The skilled practitioner will recognize that in some implementations the laptop computer includes other components not relevant to the present discussion, and therefore do not require elaboration.

User device 137 is implemented as a television (TV) or a combination of TV monitor and receiver system (not shown) to provide entertainment. In an example, the TV further includes one or more additional media players/recorders, such as, video tape, DVD, and the like.

In operation, local control units (120-150) directly manage user device (122, 127, 132, and 137) access. In one embodiment, each local control unit maintains local usage records that include count down minutes for user device access. In this embodiment, system control unit 110 maintains global usage records that include count down minutes for user device access, for example, by user device type. In an example, and referring to FIG. 1 above, local control unit 120 maintains local usage records for user devices (122 and 127) that include separate user accounts having count down minutes associated with different users. In this example, each user has an account associated with each user device. In another embodiment, each local control unit maintains local usage accounts that include count down minutes for user device access. In this embodiment, system control unit 110 maintains global usage accounts that include count down minutes for user device access, for example, by user device type. In an example, and referring to FIG. 1 above, local control unit 120 maintains local usage accounts for user devices (122 and 127) that include separate user accounts having count down minutes associated with different users. In this example, each user has an account associated with each user device. In another embodiment, system control unit 110 receives a reset signal from a reset switch (not shown) operably coupled to the system control and causing the system control unit to reset and revert to operating with the most recent saved global user accounts.

Further to operation, local control units (120-150) communicate the usage reports to system control unit 110 that are based on usage information from the aforementioned local usage records. System control unit 110 updates global usage records based on the usage reports and transmits the updated global usage records to local control units (120-150). Local control units (120-150) update local usage records responsive to receipt of the updated global usage records. Local control units (120-150) selectively enable and disable user devices (122, 127, 132, and 137) based on the update local usage records. Local control units (120-150) selectively enable and disable user devices (122, 127, 132, and 137) based on the local usage records when update local usage records are not received.

Figure 2:
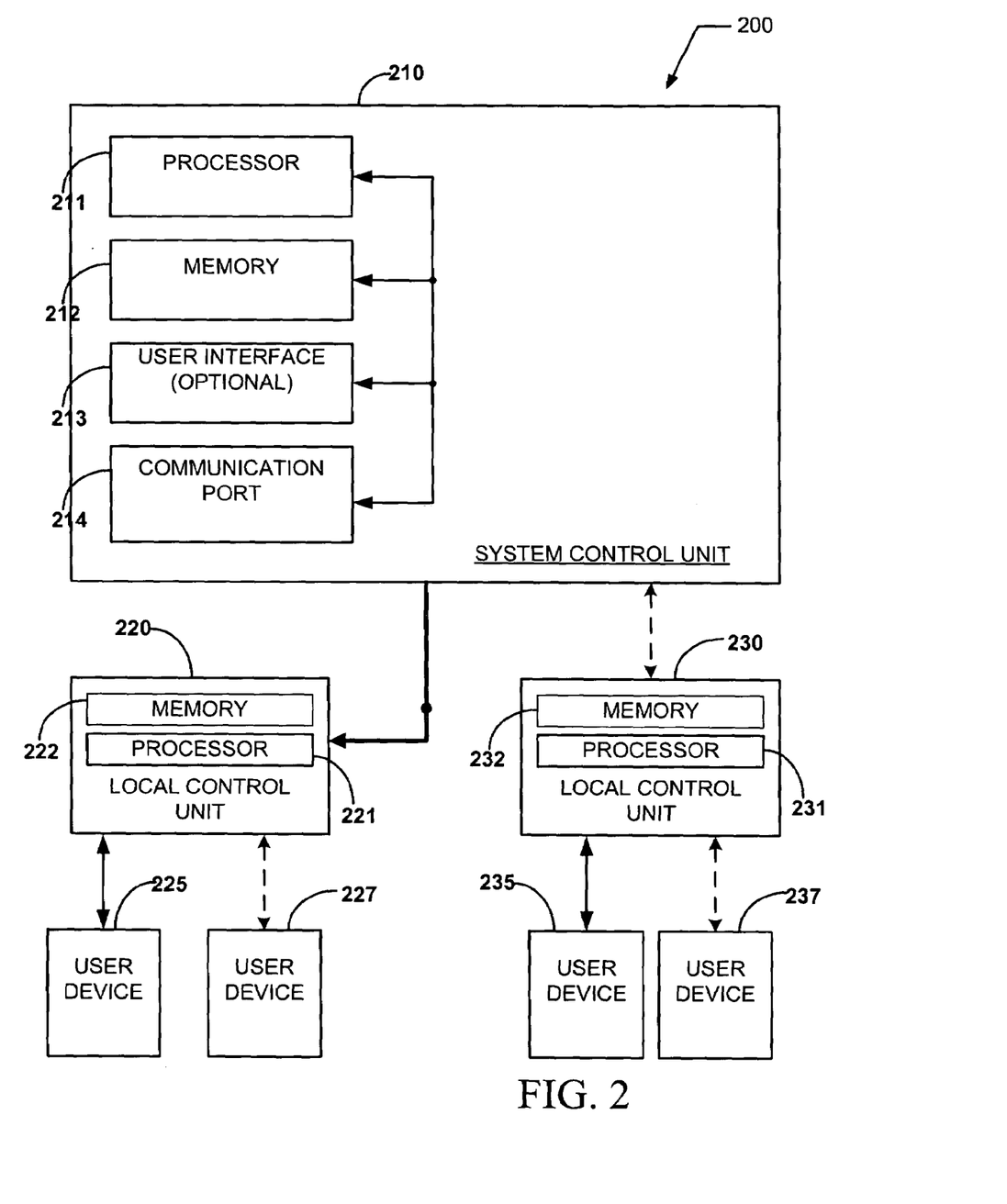
FIG. 2 is a block diagram of a controlled media system, illustrating another embodiment of the invention.

FIG. 2 is a block diagram of a controlled media system, illustrating another embodiment of the present invention. FIG. 2 illustrates a controlled media system 200 for operating a system control unit 210 for globally managing device access within a controlled media system. FIG. 2 shows a system control unit 210 in communication with local control unit 220. System control unit 210 is additionally in communication with local control unit 230. Local control unit 220 is in communication with user devices (225 and 227). Local control unit 230 is in communication with user devices (235 and 237). Controlled media system 200 can include additional components not relevant to the present discussion.

FIG. 2 also shows system control unit 210 as including a processor 211, a memory device 212, an optional user interface 213, and a communication port 214. Processor 211 is further shown enabled for bidirectional communication with memory device 212, user interface 213, and communication port 214. Local control unit 220 is shown including memory 222 and a processor 221. Local control unit 230 is also shown including memory 232 and a processor 231.

System control unit 210 is shown enabled for bidirectional communication with various devices over a communication interface, including local control unit 220 through communication port 214. System control unit 210 is further shown enabled for bidirectional communication with components of local control unit 230. The depicted connections between system control unit 210 and other devices illustrate a network; that is, each device of configuration system 200 has a unique device identification and network address.

System control unit 210 is any device configurable for global management of device access for the controlled media system 200. In one embodiment, system control unit 210 is a server computer (not specifically shown) having network services software that implements the functions of global management of device access for controlled media system 200.

Processor 211 is any microprocessor, microcontroller, application-specific integrated circuit (ASIC), or combination of the recited components, configured to execute computer instructions. In an embodiment, processor 211 includes memory for caching data, and performing digital signal processing, such as, for example, image processing algorithms. Memory device 212 includes volatile or non-volatile computer readable memory, such as, for example, random access memory (RAM), flash memory and the like. In one embodiment, processor 211 is configured to execute instructions from one or more programs stored in memory 212, and to manipulate digital data.

Optional user interface 213 is an arrangement of data-entry and display devices configured to receive user input to system control unit 210. In one embodiment, user interface 213 includes an alphanumeric key pad and an alphanumeric display suitable for receiving and displaying user accounts, user accounts status including count down minutes, user passwords, and the like.

Communication port 214 includes one or more communication interfaces configured to provide signal and data input and output to system control unit 210. In an embodiment, communication port 214 includes interfaces such as, for example, a telephone modem, a wireless access point adhering to one or more protocols, such as IEEE 802.11 and the so-called "Bluetooth" protocols, a network interface card, a direct cable interface such as PCI or EIO, a Universal Serial Bus card (USB), an optical port operating in the ultra-violet or infra-red range, and the like. In another embodiment, communication port 214 is a gateway for a local area network (LAN) or a wide area network (WAN) that couples many devices within a geographic zone, such as for example, a business computer network operating within one or more buildings. A communication-enabled device is a device that incorporates a communication gateway, such as communication port 214, having one or more communication interfaces as described above.

Local control unit 220 is any communication-enabled local control unit having a memory component 222 and a processor 221. In one embodiment, memory component 222 includes programs and data (not shown) such as, for example, an operating system, as will be known to those skilled in the art. In another embodiment, memory component 222 includes programs and data such as, for example, programs as well as data for selectively enabling and disabling user devices (225 and 227) based on local usage records. The skilled practitioner will recognize that in some implementations personal computer 220 includes other components not relevant to the present discussion, and therefore do not require elaboration.

Local control unit 230 is any wireless communication-enabled local control unit having a memory component 232 and a processor 231. In one embodiment, memory component 232 includes programs and data (not shown) such as, for example, an operating system, as will be known to those skilled in the art. In another embodiment, memory component 232 includes programs and data such as, for example, programs as well as data for selectively enabling and disabling user devices (235 and 237) based on local usage records. The skilled practitioner will recognize that in some implementations local control unit 230 includes other components not relevant to the present discussion, and therefore do not require elaboration.

User devices (225 and 235) are any communication-enabled user devices in communication with local control units (220 and 230), respectively. Examples of user devices (225 and 235) include a television device, a computing device, a radio device, a sound system device, a console entertainment device, a printer device, a telephone device, and Internet access devices, such as cable modem, DSL modem, broadband router, and the like.

User devices (227 and 237) are any wireless communication-enabled user devices in wireless communication with local control units (220 and 230, respectively). Examples of user devices (227 and 237) include a television device, a computing device, a radio device, a sound system device, a console entertainment device, a printer device, a telephone device, and Internet access devices, such as cable modem, DSL modem, broadband router, and the like.

In operation, local control units (220 and 230) directly manage device access within the controlled media system 200. Local control units (220 and 230) selectively enable and disable user devices (225, 227, 235, and 237) based on local usage records. An example of a local control unit selectively enabling and disabling a user device is detailed in FIGS. 3 and 4, below. Local control units (220 and 230) produce local usage reports that are based on usage information from the aforementioned local usage records. In one embodiment, each local control unit maintains local usage records that include count down minutes for user device access. In another embodiment, each user device includes a plurality of operating modes, such as, for example an entertainment mode and a study mode. In this embodiment, each local control unit is configured to maintain separate user accounts associated with each operating mode.

Further to operation, local control units (220-230) communicate the usage reports to system control unit 210 and receive updated global usage records from system control unit 210. Local control units (220-230) update local usage records responsive to receipt of the updated global usage records. Local control units (220-230) selectively enable and disable user devices (225, 227, 235, and 237) based on the update local usage records. Local control units (220-230) selectively enable and disable user devices (225, 227, 235, and 237) based on the local usage records when updated global usage records are not received.

In an example, local control units (220 and 230) directly manage device access within the controlled media system 200 utilizing user interfaces (described in FIG. 3 below) that allow a user to log in and log out of an account associated to the user and the specific device being utilized. This information is then communicated to system control unit 210. In this example, system control unit 210 utilizes software, such as, a spreadsheet that can be accessed, via an administrator password, to allow an administrator to enter, review, and update user allocated usage time. In this example, a system administrator, via an administrator password, can review a specified user's usage of a specified user device, such as educational use of a computer, and allocate additional usage time to a different user device, such as, a TV as a reward for educational use of the computer. In another example, a system administrator, via an administrator password, can reset system control unit 210, such as, to factory presets.

Figure 3:
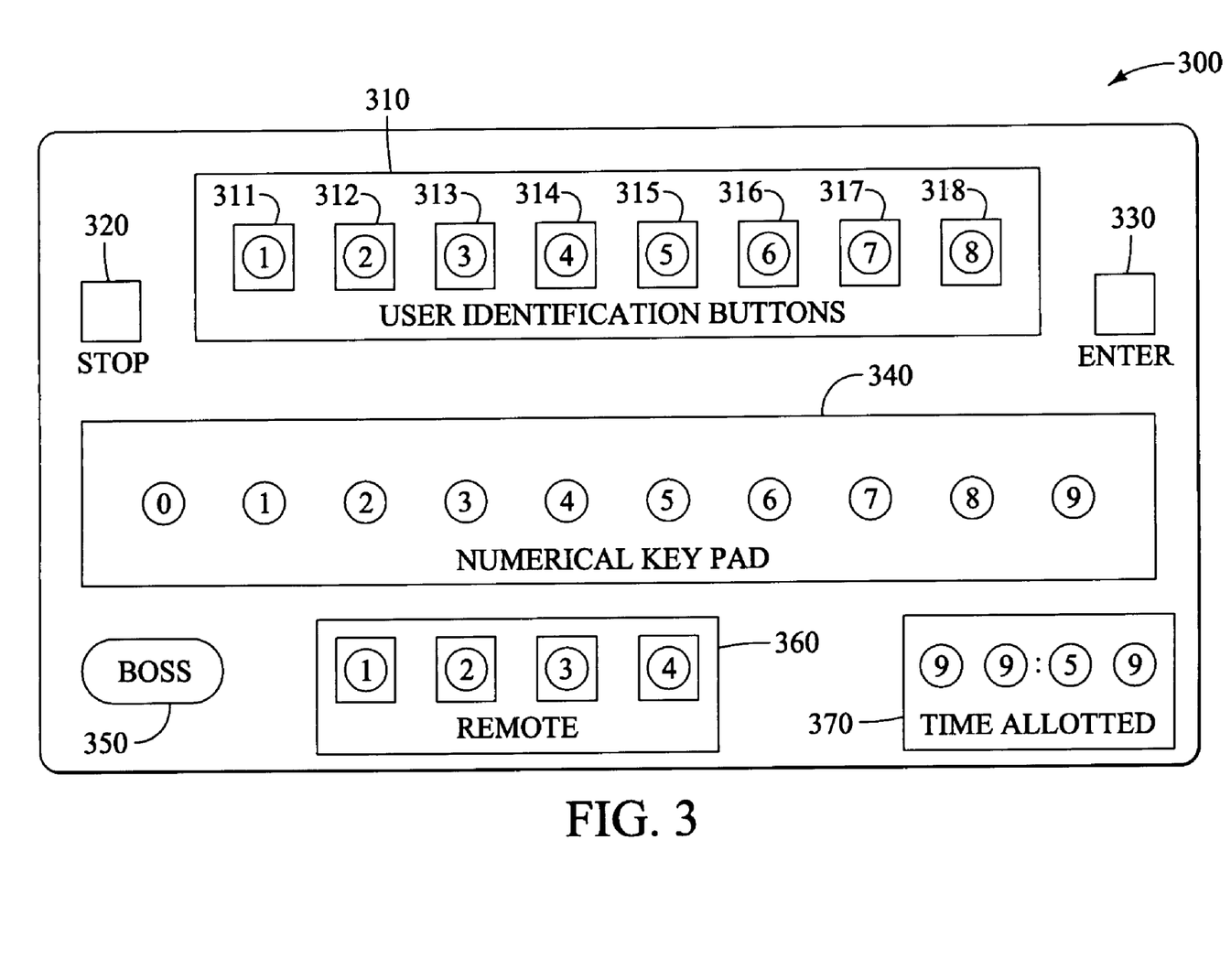
FIG. 3 is a front facing view of an illustrative media console, in accordance with an embodiment of the invention.

FIG. 3 is a front facing view of an illustrative media console. FIG. 3 illustrates one embodiment of a front facing view of a local control unit 300 for managing device access within a controlled media system (e.g., systems 100 and 200 of respective FIGS. 1 and 2). Local control unit 300 includes user identification buttons 310, a stop button 320, an enter button 330, a numerical keypad 340, "BOSS" button 350, remote buttons 360, and time allotted display 370. User identification buttons 310 further includes a plurality of individual user identification buttons (311-318). Local control unit 300 can include additional device control components that are appreciated by those having skill in the art and included in other embodiments, such as, a wireless device receiver sensor and the like.

In one embodiment, a user accesses electric devices, such as media devices, by activating the "BOSS" button 350, which activates local control unit 300. The user is then prompted and activates one of the individual user identification buttons (311-318) followed by activation of enter button 330. Then user then provides a password utilizing numerical keypad 340 followed by activation of enter button 330. In another embodiment, numerical keypad 340 is implemented as an alphanumeric keypad. The user then chooses a device to activate and activates a remote button associated with that user device within remote buttons 360. The user device is then activated. Local control unit 300 then determines the amount of time units remaining in the user account associated with the chosen user device. Time allotted display 370 displays the time remaining in the user's account for the chosen user device. Similarly, switching between user devices requires a user to provide a password utilizing numerical keypad 340, followed by activation of enter button 330, and activation a remote button associated with the desired user device within remote buttons 360.

Figure 4:
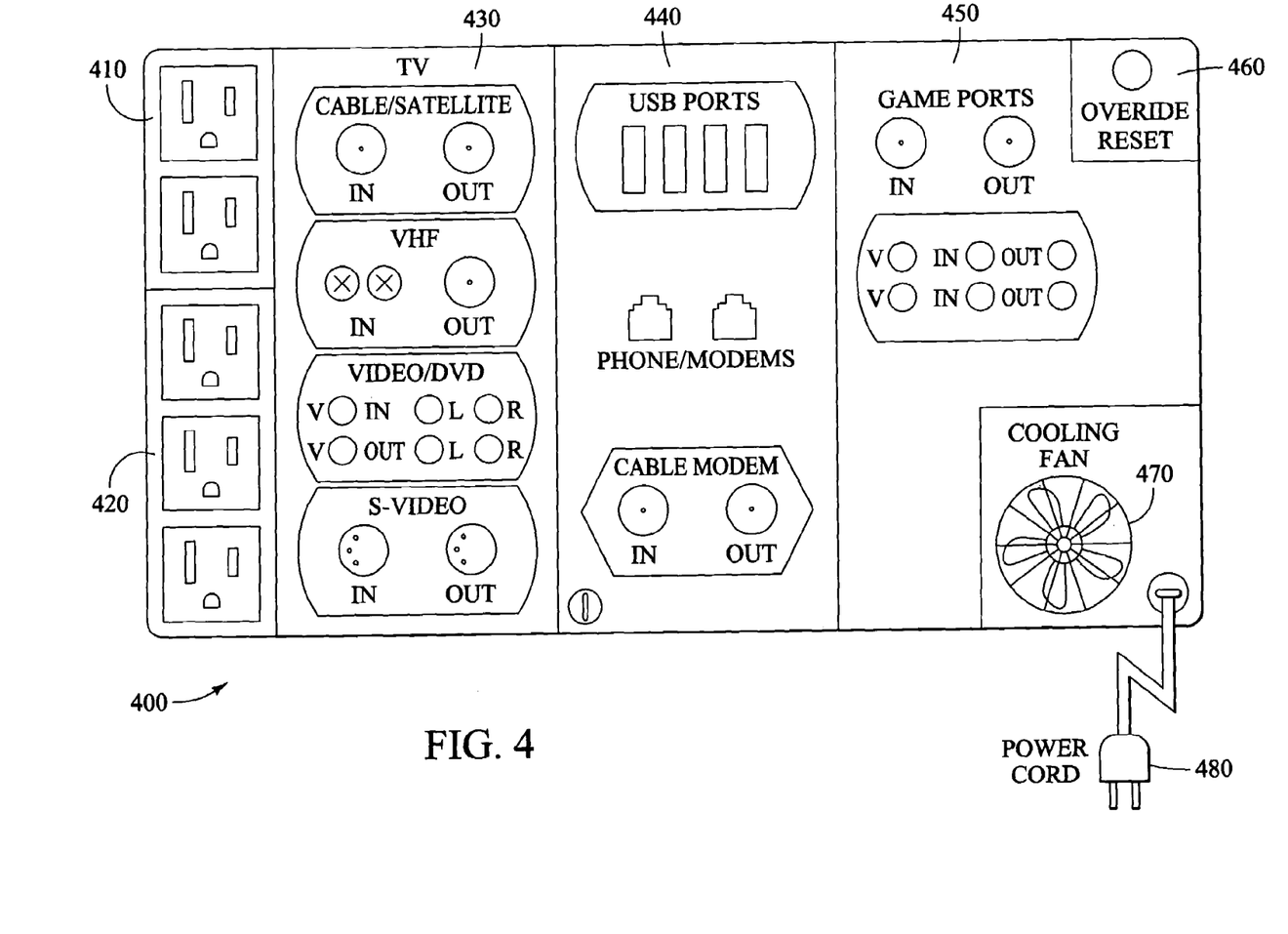
FIG. 4 is a rear facing view of an illustrative media console, in accordance with an embodiment of the invention.

FIG. 4 is a rear facing view of an illustrative media console. FIG. 4 illustrates one embodiment of a rear facing view of a local control unit 400 for managing device access within a controlled media system. Local control unit 400 includes at least one controlled power outlet 410, at least one slave power outlet 420, TV Input/output (I/O) device controls 430, computer I/O controls 440, console gaming controls 450, override button 460, cooling fan 470, and power cord 480. In one embodiment, override button 460 is used to terminate operations of local control unit 400. In another embodiment, override button 460 is used to reset operations of local control unit 400. In another embodiment, override reset button 460 detects tampering of an local control unit 400, causing local control unit 400 to communicate the tampering to the system control unit, and terminating the functioning of local control unit 400. In an example, local control unit 400 further includes a security cover ("not shown") covering the back panel and pressing against override reset button 460. In this example, if the security cover is pulled away from the back panel, the override reset button 460 trips the reset. In another example, the function of override reset button 460 can be overridden by entry of a password to allow authorized personnel to open the security cover. Local control unit 400 can include additional device control components that are appreciated by those having skill in the art and included in other embodiments.

In one embodiment, when local control unit 400 is activated power is available from each slave power outlet 420. In this embodiment, each controlled power outlet 410 provides power when an associated user device is activated. TV Input/output (I/O) device controls 430, computer I/O controls 440, and console gaming controls 450 also become active when an associated user device is activated. In an example, a user enters the correct password and chooses a user device (e.g. for a TV and DVD player) having time units remaining utilizing local control unit 300 in FIG. 3. In this example, controlled power outlets 410 receive power for the user devices and local control unit 400 allows signals to be received from the DVD player and then transmitted to the TV via TV Input/output (I/O) device controls 430.

Figure 5:
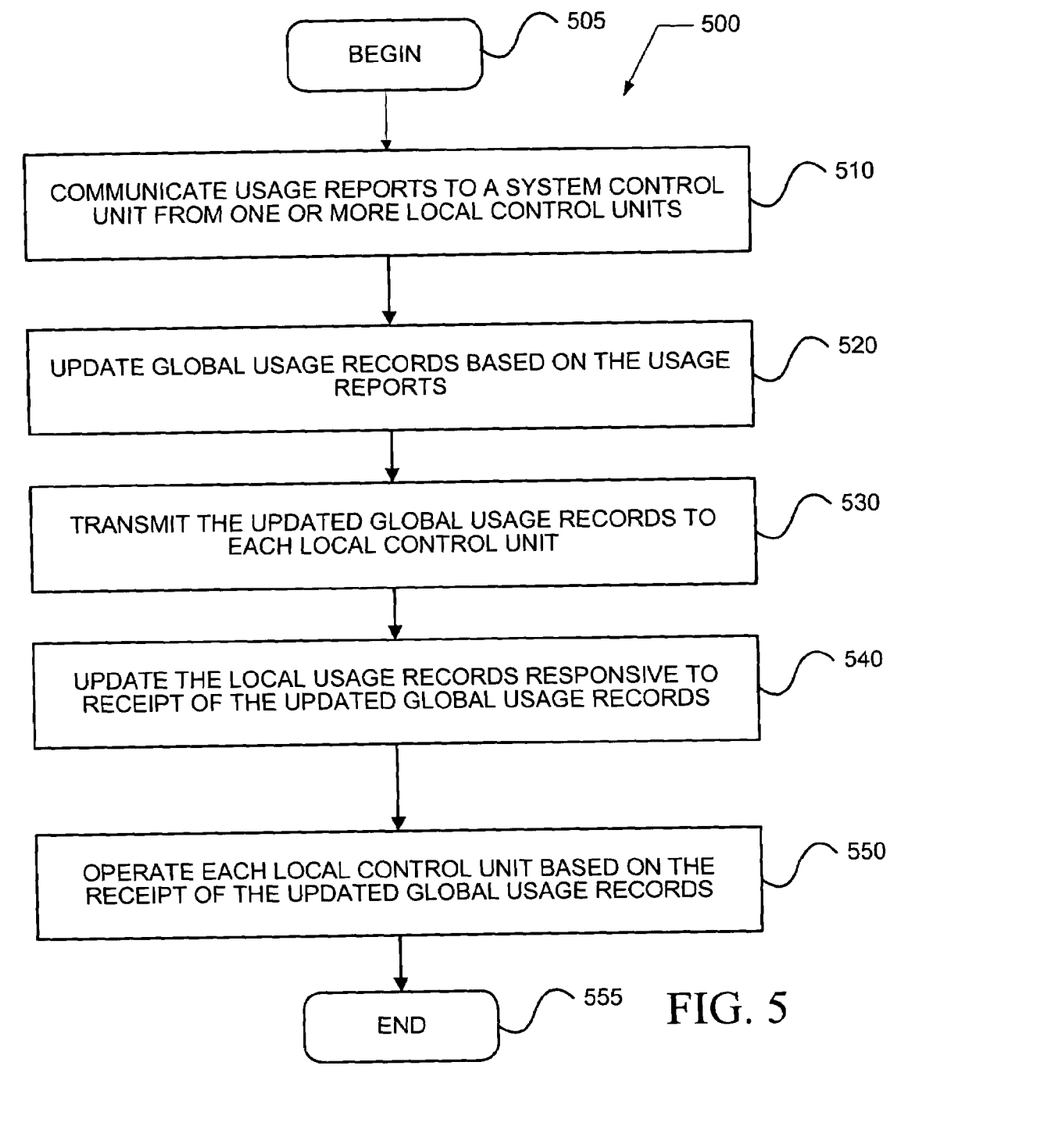
FIG. 5 is a flow diagram depicting a method of managing device access in a controlled media system, in accordance with an embodiment of the invention.

FIG. 5 is a flow diagram depicting a method 500, in accordance with another embodiment of the present invention. FIG. 5 illustrates a method 500 of managing media access in a controlled media system. In one embodiment, method 500 is implemented with components of the exemplary system of FIGS. 1 and 2 and the exemplary media console as described with reference to FIGS. 3 and 4. In another embodiment, one or more steps of method 500 are embodied in a computer readable medium containing computer readable code such that a series of steps are implemented when the computer readable code is executed on a computing device. Method 500 begins at step 505. Various steps of the method 500 are described with respect to a local control unit performing the method in conjunction with a system control unit. In some implementations, certain steps of method 500 are combined, performed simultaneously, or in a different order, without deviating from the objective of method 500 or producing different results.

At step 510 (FIG. 5), usage reports are communicated to a system control unit from one or more local control units. The usage reports are based on usage information from local usage records associated with one or more user devices controlled by each local control unit. In an example and referring to FIG. 2 above, usage reports are communicated to system control unit 210 from one or more local control units (220 and 230). In one embodiment, the communication of the usage reports is periodic. In another embodiment, the communication of the usage reports is responsive to changes in the local usage records. In an example, the usage records include count down minutes for user device access. In another embodiment, communicating the usage reports to a system control unit from each local control unit includes polling each local control unit to identify usage reports, requesting the identified usage report from each local control unit, detecting the reception of the requested usage report from each local control unit, and storing the received usage reports at the system control unit.

At step 520 (FIG. 5), global usage records are updated based on the usage reports. In one embodiment, updating the global usage records based on the usage reports includes retrieving usage reports, parsing the usage reports to obtain usage information associated with each user device, associating the parsed usage information with one or more user accounts, and producing updated global usage records based on the associations.

At step 530 (FIG. 5), the updated global usage records are transmitted to each local control unit. In one embodiment, the updated global usage records are transmitted from the system control unit to each local control unit. In an example, and referring to FIG. 2 above, the updated global usage records are transmitted from system control unit 210 to local control units (220 and 230).

At step 540 (FIG. 5), the local usage records are updated responsive to receipt of the updated global usage records. In one embodiment, the local usage records within each local control unit are updated responsive to receipt of the updated global usage records. In an example, and referring to FIG. 2 above, the local usage records within each local control unit (220 and 230) are updated responsive to receipt of the updated global usage records. In another embodiment, updating the local usage records responsive to receipt of the updated global usage records includes detecting the reception of updated global usage records to each local control unit and overwriting the local usage records of each local control unit to produce updated local usage records based on the updated global usage records. In yet another embodiment, updating the local usage records responsive to receipt of the updated global usage records includes detecting the reception of the updated global usage records to each local control unit, analyzing the updated global usage records at each local control unit to determine whether the updated global usage records include updates for the respective control unit, and overwriting portions of the local usage records of each local control unit to produce updated local usage records based on the analysis of the updated global usage records at each local control unit.

At step 550 (FIG. 5), each local control unit is operated based on the receipt of the updated global control records. When updated global usage records are received, each local control unit selectively enables and disables each user device based on the updated local usage records. When updated global usage records are not received, each local control unit selectively enables and disables each user device based on local usage records.

At step 555, the method ends.

Figure 6:
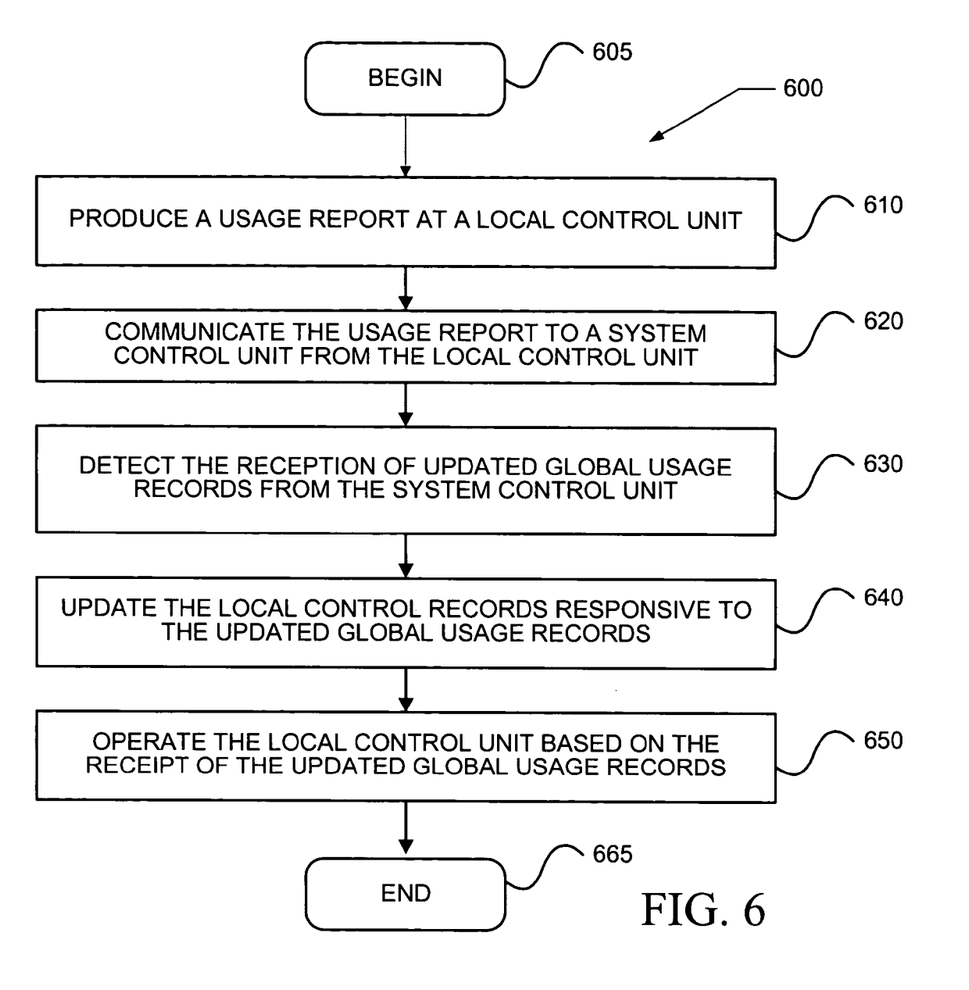
FIG. 6 is a flow diagram depicting a method of managing device access in a controlled media system, in accordance with another embodiment of the invention.

FIG. 6 is a flow diagram depicting a method 600, in accordance with another embodiment of the present invention. FIG. 6 illustrates a method 600 of managing media access in a controlled media system. In one embodiment, method 600 is implemented with components of the exemplary system of FIGS. 1 and 2 and the exemplary media console as described with reference to FIGS. 3 and 4. In another embodiment, one or more steps of method 600 are embodied in a computer readable medium containing computer readable code such that a series of steps are implemented when the computer readable code is executed on a computing device. Method 600 begins at step 605. Various steps of the method 600 are described with respect to a local control unit performing the method in conjunction with a system control unit (e.g., system control units 110 and 210 of respective FIGS. 1 and 2). In some implementations, certain steps of method 600 are combined, performed simultaneously, or in a different order, without deviating from the objective of method 600 or producing different results.

At step 610 (FIG. 6), a usage report is produced at a local control unit. The usage report is based on usage information from local usage records associated with one or more user devices controlled by the local control unit. In one embodiment, usage records include count down minutes for user device access. In one embodiment, producing the usage report at a local control unit includes retrieving the local usage records associated with each user device, parsing the local usage records to obtain usage information associated with each user device, associating the parsed usage information with one or more user accounts, and generating the usage report based on the associations.

At step 620 (FIG. 6), the usage report is communicated to a system control unit from the local control unit. In one embodiment, the communication of the usage reports is periodic. In another embodiment, the communication of the usage reports is responsive to changes in the local usage records. In an example and referring to FIG. 2 above, the usage report is communicated to system control unit 210 from the local control unit 220.

At step 630 (FIG. 6), the reception of updated global usage records at the local control unit from the system control unit is detected. The updated global usage records associate device usage with one or more user accounts. In an example, and referring to FIG. 1 above, the reception of updated global usage records at local control unit 220 from system control unit 210 is detected.

At step 640 (FIG. 6), the local usage records are updated responsive to receipt of the updated global usage records. In one embodiment, updating the local usage records responsive to receipt of the updated global usage records includes detecting the reception of the updated global usage records to each local control unit and overwriting the local usage records of each local control unit to produce updated local usage records. In another embodiment, updating the local usage records responsive to receipt of the updated global usage records includes detecting the reception of the updated global usage records to each local control unit, analyzing the updated global usage records at each local control unit to determine whether the updated global usage records include updates for the respective control unit, and overwriting portions of the local usage records of each local control unit to produce updated local usage records based on the analysis of the updated global usage records at each local control unit.

At step 650 (FIG. 6), each local control unit is operated based on the receipt of the updated global control records. When updated global usage records are received, each local control unit selectively enables and disables each user device based on the updated local usage records. When updated global usage records are not received, each local control unit selectively enables and disables each user device based on local usage records.

At step 465, the method ends.

It is anticipated that the invention will be embodied in other specific forms, not specifically described, that do not depart from its spirit or essential characteristics. The described embodiments are to be considered in all respects only as illustrative and not restrictive, the scope of the invention being defined by the appended claims and equivalents thereof.

I claim:

1. A computer readable storage medium storing a computer program thereon executable by a computer processor to manage media access in a controlled media system, comprising:
   computer readable code to communicate usage reports to a system control unit from one or more local control units, the usage reports based on usage information from local usage records associated with one or more user devices controlled by each local control unit, wherein each user device includes a plurality of operating modes including an entertainment mode and a study mode, and wherein each local control unit is configured to maintain separate user accounts associated with each operating mode;

computer readable code to update global usage records based on the usage reports, the global usage records associating device usage with user accounts;

computer readable code to update the separate user accounts at each local control unit based on whether the user device is operating in the entertainment mode or the study mode;

computer readable code to transmit the updated global usage records to each local control unit; and computer readable code to update the local usage records responsive to receipt of the updated global usage records and cause each local control unit to selectively enable and disable each user device based on the updated local usage records, and, when updated global usage records are not received to cause each local control unit to selectively enable and disable each user device based on the local usage records.

2. The computer readable storage medium of claim 1, wherein the computer readable code to communicate the usage reports to a system control unit from each local control unit, comprises:

computer readable code to poll each local control unit to identify usage reports;

computer readable code to request the identified usage report from each local control unit;

computer readable code to detect the reception of the requested usage report from each local control unit; and computer readable code to store the received usage reports at the system control unit.

3. The computer readable storage medium of claim 1, wherein the computer readable code to update the global usage records based on the usage reports, comprises:

computer readable code to retrieve usage reports;

computer readable code to parse the usage reports to obtain usage information associated with each user device;

computer readable code to associate the parsed usage information with one or more user accounts; and computer readable code to produce updated global usage records based on the associations.

4. The computer readable storage medium of claim 1, wherein the computer readable code to update the local usage records responsive to receipt of the updated global usage records, comprises:

computer readable code to detect the reception of updated global usage records to each local control unit; and computer readable code to overwrite the local usage records of each local control unit to produce updated local usage records based on the updated global usage records.

5. The computer readable storage medium of claim 1, wherein the computer readable code to update the local usage records responsive to receipt of the updated global usage records, comprises:

computer readable code to detect the reception of the updated global usage records to each local control unit;

computer readable code to analyze the updated global usage records at each local control unit to determine whether the updated global usage records include updates for the respective control unit; and computer readable code to overwrite portions of the local usage records of each local control unit to produce updated local usage records based on the analysis of the updated global usage records at each local control unit.

6. The computer readable storage medium of claim 1, wherein the communication of the usage reports is periodic.

7. The computer readable storage medium of claim 1, wherein the communication of the usage reports is responsive to changes in the local usage records.

8. The computer readable storage medium of claim 1, wherein the usage records include count down minutes for user device access.

9. A computer readable storage medium storing a computer program thereon executable by a computer processor to manage media access in a controlled media system, comprising:

computer readable code to produce a usage report at a local control unit, the usage report based on usage information from local usage records associated with one or more user devices controlled by the local control unit, wherein each user device includes a plurality of operating modes including an entertainment mode and a study mode, and wherein the local control unit is configured to maintain separate user accounts associated with each operating mode;

computer readable code to communicate the usage report to a system control unit from the local control unit for updating global usage records;

computer readable code to detect the reception of updated global usage records from the system control unit, the updated global usage records associating device usage user accounts;

computer readable code to update the separate user accounts at the local control unit based on whether the user device is operating in an entertainment mode or a study mode; and computer readable code to update the local usage records responsive to receipt of the updated global usage records, and cause the local control unit to selectively enable and disable each user device based on the updated local usage records, and, when updated global usage records are not received the local control unit to selectively enable and disable each user device based on the local usage records.

10. The computer readable storage medium of claim 9, wherein the computer readable code to produce the usage report at a local control unit, comprises:

computer readable code to retrieve the local usage records associated with each user device;

computer readable code to parse the local usage records to obtain usage information associated with each user device;

computer readable code to associate the parsed usage information with one or more user accounts; and computer readable code to generate the usage report based on the associations.

11. The computer readable storage medium of claim 9, wherein the computer readable code to update the local usage records responsive to receipt of the updated global usage records, comprises:

computer readable code to detect the reception of the updated global usage records to each local control unit; and computer readable code to overwrite the local usage records of each local control unit to produce updated local usage records.

12. The computer readable storage medium of claim 9, wherein the computer readable code to update the local usage records responsive to receipt of the updated global usage records, comprises:

computer readable code to detect the reception of the updated global usage records to each local control unit;

computer readable code to analyze the updated global usage records at each local control unit to determine whether the updated global usage records include updates for the respective control unit; and computer readable code to overwrite portions of the local usage records of each local control unit to produce updated local usage records based on the analysis of the updated global usage records at each local control unit.

13. The computer readable storage medium of claim 9, wherein the communication of the usage reports is periodic.

14. The computer readable storage medium of claim 9, wherein the communication of the usage reports is responsive to changes in the local usage records.

15. The computer readable storage medium of claim 9, wherein usage records include count down minutes for user device access.

16. A controlled media system, comprising:

a system control unit;

at least one local control unit in selective communication with the system control unit;

at least one user device controlled by, and in selective communication with, each local control unit;

at least one processor within the system control unit; and at least one computer readable memory device within the system control unit which is readable by the processor, the computer readable memory device including a series of computer executable steps configured to cause the processor to:

communicate a usage report to the system control unit from each local control unit, each usage report based on usage information from a local usage record associated with each user device controlled by each local control unit;

update a global usage record based on each usage report, the global usage record associating user device usage with one or more user accounts; and transmit the updated global usage record to each local control unit;

wherein each local usage record is updated responsive to receipt of the updated global usage record at each the local control unit, the associated local control unit selectively enabling and disabling the at least one user device associated with the local control unit based on the associated updated local usage record;

wherein each associated local control unit is configured to selectively enable and disable the associated at least one user device based on the local usage record when the updated global usage record is not received; and wherein each user device includes a plurality of operating modes including an entertainment mode and a study mode, and wherein the local control units are configured to maintain separate user accounts associated with each operating mode.

17. The system of claim 16, wherein the computer executable steps configured to cause the processor to communicate usage reports to the system control unit from the local control unit comprise a series of computer executable steps configured to cause the processor to:

poll each local control unit to identify a usage report;

request the identified usage report from each local control unit;

receive the requested usage report from each local control unit; and store the received usage reports at the system control unit.

18. The system of claim 16, wherein the computer executable steps configured to cause the processor to update the global usage records based on the usage reports comprise a series of computer executable steps configured to cause the processor to:

retrieve the usage report from each local control unit;

parse the retrieved usage report to obtain usage information from each user device associated with the associated local control unit;

associate the parsed usage information with the one or more user accounts; and produce an updated global usage record based on the associations.

19. The system of claim 16, wherein the communication of the usage reports is periodic.

20. The system of claim 16, wherein the communication of the usage reports is responsive to changes in each local usage record.

21. The system of claim 16, wherein the usage records include count down minutes for user device access.

22. A controlled media system, comprising:

a system control unit, the system control unit tracking global usage of user devices by global user account;

at least one local control unit in selective communication with the system control unit, each local control unit tracking usage information including local use of user devices by local user account and communicating usage reports based on the usage information to the system control unit; and at least one user device controlled by, and in selective communication with each local control unit;

wherein each local control unit is configured to selectively enable and disable associated user devices based on the local control unit monitoring of one or more local user accounts; and wherein the system control unit provides updated global user accounts to the local control unit based on the global usage of user devices, each local control unit updating the local user accounts with the updated global user accounts; and wherein each user device includes a plurality of operating modes including an entertainment mode and a study mode, and wherein the local control units are configured to maintain separate user accounts associated with each operating mode.

23. The system of claim 22, wherein the user accounts include count down minutes for user device access.

24. The system of claim 22, wherein the usage reports are periodically communicated from each local control unit to the system control unit.

25. The system of claim 22, wherein the usage reports are communicated from each local control unit to the system control unit responsive to changes in the local user accounts.

26. The system of claim 22, further comprising a reset switch operably coupled to the system control unit, the reset switch causing the system control unit to reset and revert to operating with the most recent saved global user accounts.

27. The system of claim 22, further comprising at least one reset switch, each reset switch operably coupled to a local control unit, the at least one reset switch detecting tampering of an associated local control unit, causing said local control unit to communicate the tampering to the system control unit, and terminating the functioning of said local control unit.

* * * * *